Figure 1:
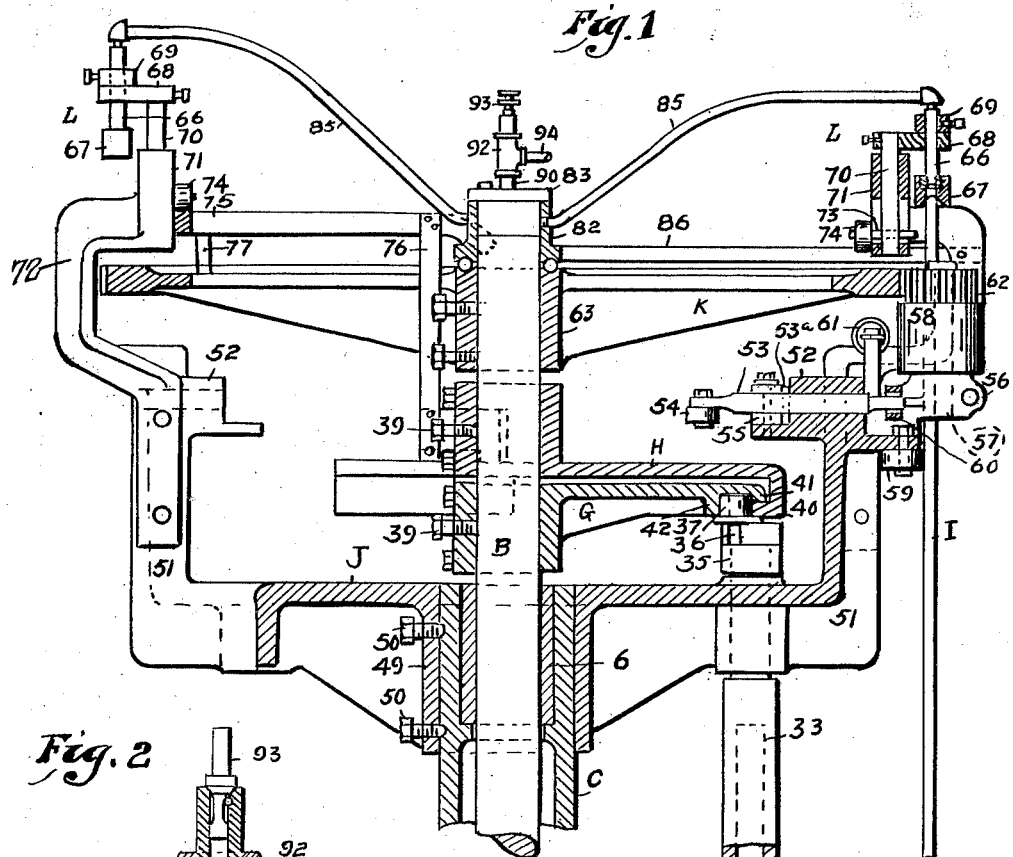

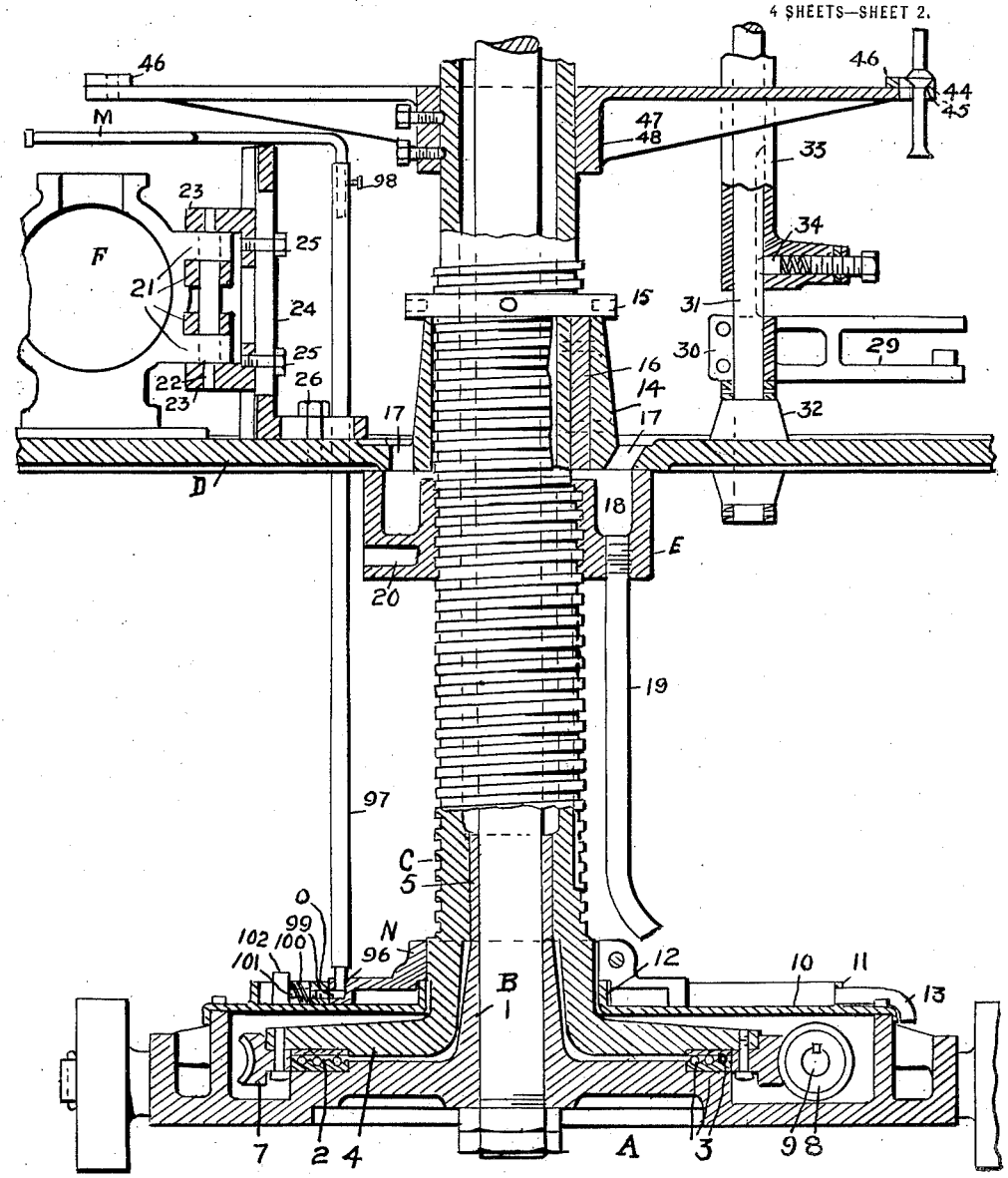
Fig. 1ª

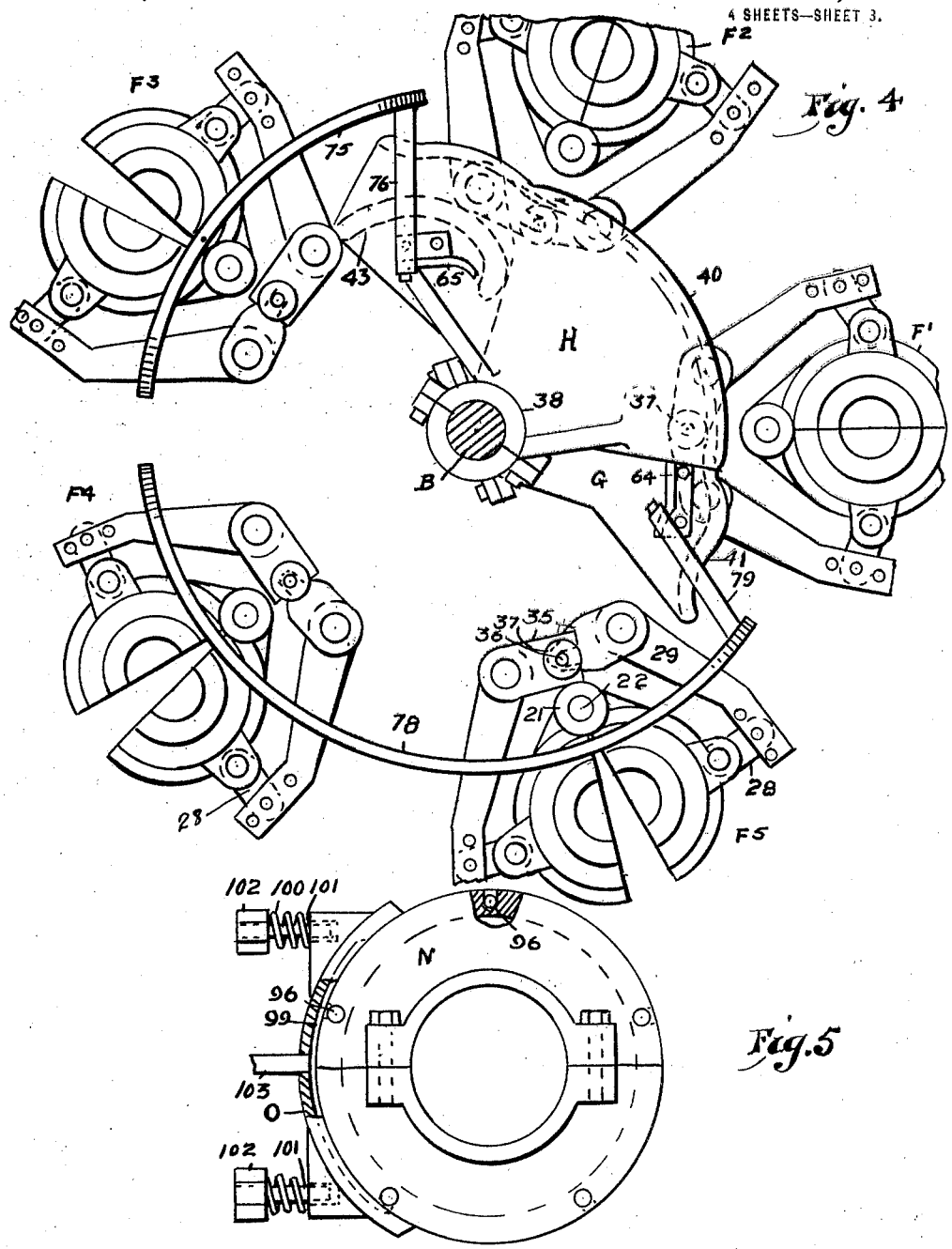

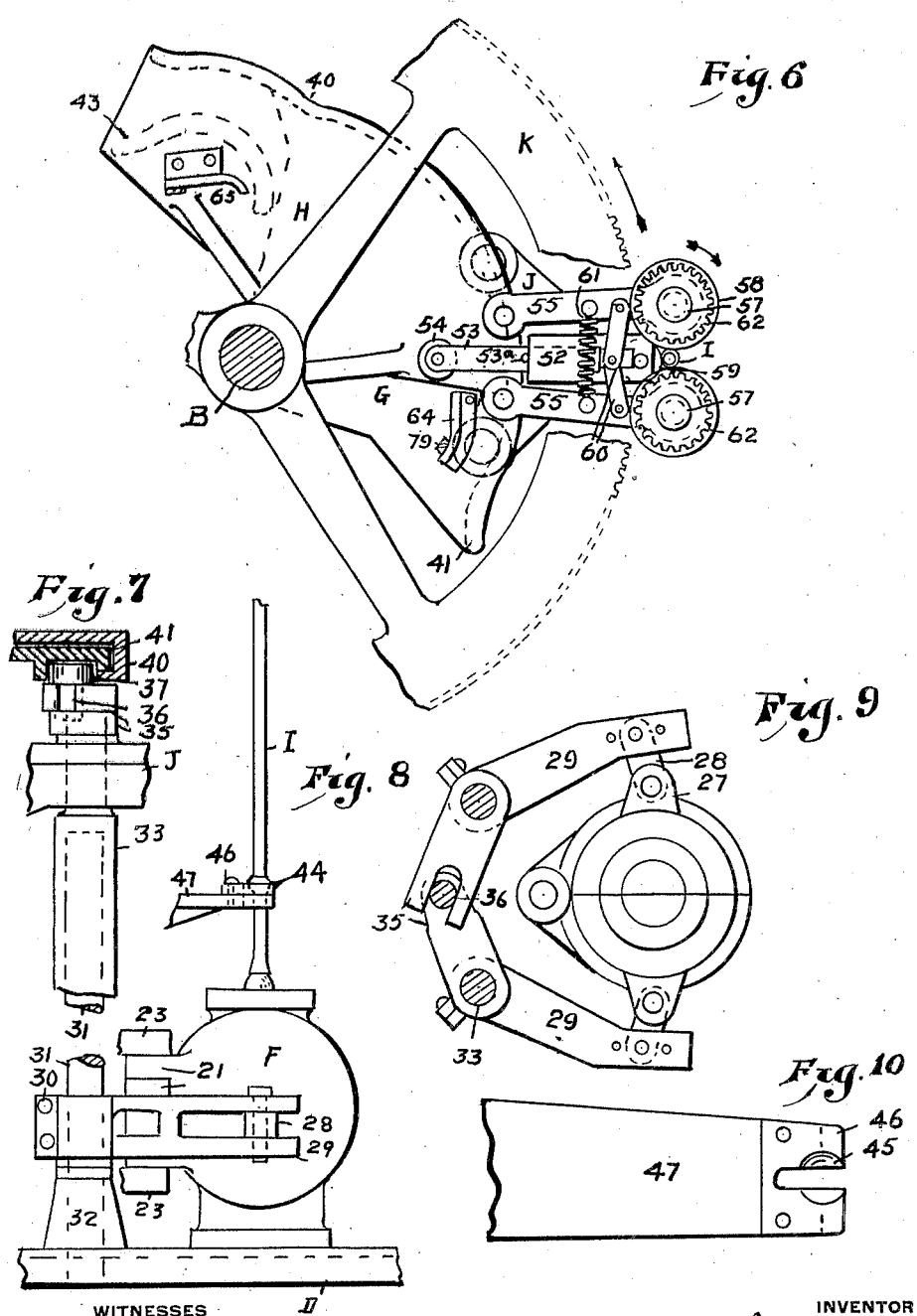

Patented Sept. 12, 1922.

1,428,855

UNITED STATES PATENT OFFICE.

WILLIAM J. MILLER, OF SWISSVALE BOROUGH, PENNSYLVANIA.

APPARATUS FOR MANUFACTURING GLASS ARTICLES.

Application filed September 23, 1919. Serial No. 325,617.

*To all whom it may concern:*

Be it known that I, WILLIAM J. MILLER, a citizen of the United States, and residing in the borough of Swissvale, in the county of Allegheny and State of Pennsylvania, have invented or discovered new and useful Improvements in Apparatus for Manufacturing Glass Articles, of which the following is a specification.

My invention consists in certain new and useful improvements in machines for manufacturing articles of glassware, and it more especially is intended to be applied to paste mold machines.

More particularly my present invention consists in a new and improved mounting for the molds and means for closing and opening the same; the improved means for mounting, rotating and supplying compressed air to the blow pipes, and in improved means for cooling the opened molds.

Other novel features of construction and arrangement of parts will appear from the following description.

Figure 2:
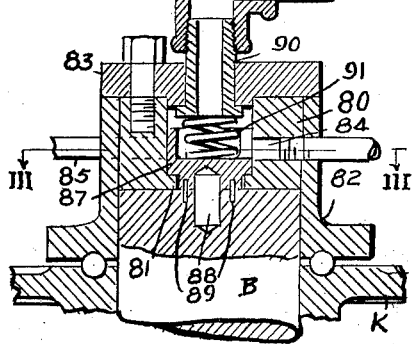
Figure 3:
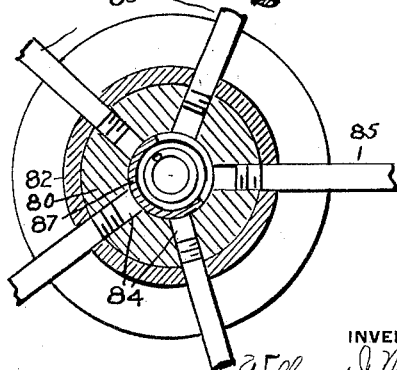

In the accompanying drawings, which are however merely intended to illustrate a practical embodiment of my invention without limiting the scope of the same to the construction shown, Fig. 1, Sheet 1, and Fig. 1ª, Sheet 2, form together a vertical section of a paste mold machine embodying the principles of my invention; Fig. 2 is an enlarged detail in vertical section showing the main air valve for the supply of compressed air to the blow heads; Fig. 3 is a sectional view taken along the line III—III in Fig. 2; Fig. 4 is a diagrammatic view showing the means for opening and closing the molds, for raising and lowering the blow heads, and for mounting and dismounting the blow pipes; Fig. 5 is a separate view of the water head and shoe which supplies water for spraying the molds when open; Fig. 6 is a detail view showing the method of rotating the blow pipe and the release for the same, the mold closing and opening cams being also shown; Fig. 7 is a detail showing the mold cams and the roller of one of the molds which engages said cams for closing and opening the mold; Fig. 8 is a detail in side elevation showing one of the molds and its mounting and the lower end of its blow pipe; Fig. 9 is a detail in plan showing the mechanism for closing and opening the molds, and Fig. 10 is a broken plan view showing one of the blow pipe supporting arms.

The following is a detailed description of the drawings, reference being first had to Figs. 1 and 1ª.

A is a bed which may be conveniently a wheeled truck so that the machine may be moved from one location to another. Said bed is provided with an axial, vertically deposed hub 1 in which is fixed the vertical standard B. 2 is an annular raceway on said bed concentric with said hub and containing anti-friction members or balls 3 which rotatably support on said bed the circular base 4 of the sleeve C which fits loosely down over and rotates on said standard B, said standard protruding from the top of said sleeve, as shown.

5 is a bushing interposed between the standard and sleeve at their lower ends to give a rotating fit, said bushing resting on top of the hub 1 while near its upper end the sleeve C is provided with an internal annular flange which supports a second bushing 6 and keeps the sleeve C from wobbling as it rotates. The base 4 of the sleeve C is provided around its perimeter with an annular gear 7 which meshes with a worm 8 on a driven shaft 9 journaled in said bed, whereby the sleeve C is rotated. The rotation in the embodiment shown in the drawings is assumed to be counterclockwise. The bed is inclosed to cover the base 4, the annular gear 7 and the worm, by an annular top plate 10 attached to the bed and from the axial opening of which the sleeve C upwardly protrudes. The platform is provided with upturned outer edge 11, and upturned inner edge 12 to form an annular water pan from which the water escapes through a drainage pipe 13.

D is the circular mold table provided with the upwardly extended axial hub 14 which fits down over the sleeve C. The sleeve C is exteriorily threaded and the table D is adjustably supported thereon by means of screw collar E which is screwed on the sleeve beneath the mold table, while the table is held snug against the collar, by means of top lock nut 15. The hub of the table is vertically slotted, as is also the sleeve C, so that the key 16 may be inserted to insure the table rotating with the sleeve.

The table is provided with holes 17 which drain the sprayed water down into annular trough 18 in the collar E which trough is provided with a downwardly extending drainage pipe 19 which discharges the water into the pan formed by the cover 10. 20 is a radial hole in the screw collar E for the insertion of a tool to turn the collar for raising or lowering it on the sleeve C.

The table of the machine illustrated is provided with five molds, but it will be understood that any number of molds may be used as the practical requirements dictated. The molds F are of the hinged type each part being provided with hinge lugs 21 which are engaged by pintles 22 whose ends are reduced and engage the vertical perforations in the upper and lower brackets 23 which are mounted on the mold support 24 and adjustable vertically thereon by means of bolts 25 extending through a vertical slot in said support and engaging threaded holes in the brackets 23. The foot of the support 24 is slotted radially of the table D and bolts 26 extend through said slots and engage threaded holes in the table. Thus the brackets 23 may be adjusted vertically while the mold support 24 may be adjusted radially of the table, thus enabling the hinging of a large range of mold sizes and shapes in place on the table.

The mold parts are each provided with a radially extended lug 27 pivotally connected by links 28 with the outer bifurcated ends of the levers 29 whose inner ends are in the form of split collars 30 which are clamped by means of bolts to the shafts 31 whose lower ends are stepped in bearings 32 on the table D while their upper ends are telescoped into the tubular lower ends of shafts 33, and to which they are resiliently keyed, as at 34. The outer ends of the levers 29 are provided with a plurality of pin holes to permit of the attachment of different sizes and shapes of molds. The upper ends of the shafts 33 are provided with adjustably fixed radial arms 35, the outer end of one of which is provided with an upwardly extending pin 36 while the other arm is slotted to engage said pin. The upper end of the pin 36 is provided with an anti-friction roller 37. It is evident that when the roller 37 is in the relative position shown in Fig. 9, the mold would be held closed, but should said roller be moved toward the right in Fig. 9, the shafts 33 would be rotated and the mold swung open. By the return of the roller to the relative position shown in Fig. 9, the mold would be again closed.

The opening and closing of the molds at the proper moments is accomplished by the engagement of their operating rollers with a suitable fixed cam track, which, as the points where the molds are to be opened and closed and the period during which the molds should be held closed in their travel around the machine may vary, I make adjustable in position and effective length.

Thus, I provide two mold cam members G and H, each provided with a split hub 38 and clamping bolts so as to be fixedly supported on the standard B. The lower cam member G has a downwardly extending hub and the upper cam member H an upwardly extending hub, as best shown in Fig. 1. Set screws 39 extending through threaded holes in said hubs and impinge upon the shaft B to properly position the cam members before the clamping hubs are tightened. The two members G and H fit into each other, as shown in Figs. 1 and 4, the lower member G being in advance and determining the closing point for the molds while the member H determines the opening point. By telescoping the members together or extending them, the period within which the molds are held closed is nicely adjustable.

The cam member H has a downwardly and inwardly turned perimetal flange 40 while the member G has a shorter downwardly turned flange 41 which fits into the flange 40 of the member H. The front end of the member G is also provided with an inner guard or flange 42. At its rear end the flange 40 of the member flares outwardly from the axis of the machine and an inner guard flange 43 is spaced away therefrom to hold the rollers against the flange 40. The front end of the flange 41 of the cam member G is also flared outwardly from the axis of the machine.

It is evident that as the mold table rotates, the molds being open as their rollers engage the front cam member G said rollers would be drawn inwardly by contact with the cam flanges and the molds closed and held closed until their rollers reached the flaring rear end of the flange 40 of the member H; in contact with which flange the rollers are held by the guard flange 43, thus opening the molds as they pass out from under the cam members. The resilient key 34 is provided so that in case a mold jams and refuses to open or close properly, the key will slip and prevent breaking the operative parts.

Referring now to Fig. 4, with the cam members adjusted as shown, mold F' has just been closed; mold $F^2$ is beginning to open; molds $F^3$, $F^4$ and $F^5$ are open.

I represents one of the blow pipes which with a gather of glass suspended from their lower ends are placed in position at the proper moment before the molds close and then are removed from the opened mold with the finished glass article attached to their lower ends. The lower ends of said pipes are slightly flared in the usual manner to engage the gather.

Intermediate of their ends said pipes I are provided with an exterior enlargement, preferably in the form of downwardly tapered circumferential flanges 44 which engage the sockets 45 on the socket blocks 46 which are bolted on the slotted ends of radial supporting arms 47 carried by the central hub 48 which encircles the sleeve C and can be fixed at any desired elevation by the set screws shown.

J is a platform whose central hub 49 is held in the desired position on the sleeve C by the set screws 50 and revolves with said sleeve. The perimeter of said platform is provided with a series of upwardly extending posts or supports 51, one of the same being alined with each mold on table D. The posts 51 are each provided with a slide bearing 52 positioned radially of the machine, and 53 represents a slide in each of said bearings provided on its inner protruding end with an anti-friction roller 54. 55 represents a pair of swinging arms having their inner ends pivoted on the post 51 while their outer ends are provided with split collars 56 and clamping bolts for mounting thereon the vertical pins 57 on which are mounted the rollers 58 which are preferably rubber surfaced. Said rollers engage the perimeter of the blow pipe I slightly outside of its center so as to tend to force it inwardly toward the machine, which tendency is counteracted by a roller 59 mounted on the post 51 which bears outwardly against the blow pipe. 60 are links which connect the arms 55 to the outer protruding end of the slide 53, and 61 is a helical spring connecting the arms 53 and thus normally holding the rollers 58 in contact with the blow pipe I. 62 represents gears mounted on or integral with the rollers 58 and in mesh with the toothed perimeter of the fixed gear K whose hub 63 encircles the standard B above the sleeve C and is adjustably fixed thereon by the set screws shown.

It is evident that as the platform J revolves in unison with the mold table D, the rollers 58 will be turned in the same direction, as indicated by the small arrows in Fig. 6, the large arrow indicating the direction of movement of the main rotary elements of the machine, thus revolving the blow pipe I during the blowing operation.

It is also evident that by forcing the slide 53 outwardly, the arms 55 will be spread, against the influence of the spring 61, thus spreading the rollers 58 apart and allowing the pipe H to be lifted out of the machine. It is of course necessary to thus spread the rollers when the finished article is to be removed from the opened mold and also when a pipe with a fresh gather is to be installed before the mold closes for the blowing operation. As the closing and opening points of the molds are adjustable by means of the cam members G and H the points at which the blow pipes are installed and dismounted should be likewise adjustable and I therefore provide the rear cam member H with a short cam projection 64 which at the proper moment engages the roller 54 and forces the slide 53 outwardly spreading the rolls 58 for the dismounting of the blow pipe. Again the cam member G is provided with a similar cam projection 65 for spreading the rolls 58 at the proper point to insert a fresh blow pipe before the mold closes. 53$^a$ is a pin on the slide 53 to limit its outward or roll spreading movement.

L represents the blow heads, one of which is provided for each blow pipe position in the machine. Said blow heads are of the following construction. 66 is a tube whose lower end is provided with a flaring socket cup 67 which is adapted to be lowered down into snug engagement with the upper end of the blow pipe I which is preferably tapered to facilitate its fitting in the cup 67. The tube 66 depends through an arm 68, its position relative thereto being determined by the adjustable collar 69. The arm 68 is fixed to the plunger 70 which slides in a vertical bearing 71 on the bracket 72 mounted on the post 51. The bearing 71 is slotted longitudinally to provide clearance for the pin 73 inserted in the plunger 70. The outer end of said pin is provided with an anti-friction roller 74. It is evident that the blow head L will rest down on the end of the pipe I except when elevated to permit the removal of the blow pipe and the insertion of a new blow pipe. As the blow head should be in its elevated position when the rollers 58 are spread and the mold opens after the blowing operation, I support a cam track 75 by means of a leg 76 fastened to the rear cam member H, the other end of said track being supported by a leg 77 which rests on the fixed gear K. Thus the roller 74 will mount up on said track as the rollers 58 are spread and the mold opens, thus raising the blow head for the release of the blow pipe. The track 75 may extend around far enough to hold the blow head elevated until the fresh blow pipe is mounted and the mold is ready to close, or I may, as shown, provide a second and similar track 78 supported from the front cam member G by a leg or legs 79.

Air is supplied to the blow heads L at the proper times in the following manner.

80 is a ring member whose lower bore is provided with an internal annular lip 81 and said ring is held in position on top of the standard B by means of its depending sleeve 82 and the removable cap 83. The member 80 and sleeve 82 are provided with radial ports 84 equal in number to the blow heads L of the machine, and each port is connected by a flexible pipe 85 with the upper end of the corresponding blow head tube 66, as shown in Fig. 1. The ring member 80 and sleeve 82 revolve on the standard B with the rotary parts of the machine. To properly synchronize the rotation of the ring and sleeve with the revolution of the blow heads, I may provide one or more radial spokes 86 connecting the sleeve with one or more of the posts 51.

87 is a cup bushing which is seated in the ring 80 and has its lower end reduced to extend down into the interior of the lip 81 and rest upon the end of the standard B, the bushing being held stationary by dowel 88 and pins 89. The annular wall of the bushing 87 is cut away for a portion of its length facing the blowing side of the machine, so that the port 84 corresponding to each blow head L is uncovered and open into the interior of the bushing 87 while the corresponding mold is traversing the arc of its travel during which compressed air is to be supplied to its blow pipe I.

90 is a nipple, having its lower end flanged, extending up through the axial opening in the lid 83, and 91 is a spring interposed between the inner end of said nipple and the bushing 87 to keep them both snugly in position and to prevent air leakage.

92 is a three way coupling screwed onto the upper protruding end of the nipple 90. The top port of said coupling being provided with an adjustable pressure relief valve 93 while the lateral port of the coupling is connected to the compressed air supply pipe 94.

M represents a substantially horse-shoe shaped water spray pipe mounted horizontally above each of the molds and revolving around the machine therewith. N is an annular split member which is clamped around the sleeve C and rotates therewith. The perimeter of said member is provided with a plurality of L-shaped ports 96, one for each mold position on the table D. The vertical legs of said ports are connected by pipes 97 with the stems of the corresponding spray pipes M, a slip joint being provided with a set screw 98 to permit of vertical adjustment of the pipes M. The horizontal legs of the ports 96 extend radially through the perimetral edge of the member N. O is a block having its face curved to fit against the perimeter of the member N and provided with a groove which forms a horizontal water chamber 99. The block O is held resiliently against the perimeter of the member N, by means of helical springs 100 coiled about pins 101 extending from said block and working in slide bearings 102 on the top cover 10, the springs bearing against the block and the bearings and thus making the water chamber 99 substantially water tight except through the ports 96. 103 represents a water pressure supply pipe connected to the chamber 98 in the block N. It is evident that when a port 96 comes into registration with the water chamber 99, water will be forced up through the port 96 and its connecting pipe 97 to the spray pipe M which will spray water into the open mold, and said spray will be maintained until the said port 96 passes out of registration with the chamber 98. The block O is so positioned that the spraying takes place after the mold is opened for the removal of the blown article and before the fresh blow pipe with its gather of glass is put in place.

The various moving parts of the machine are so synchronized that the molds as they in turn approach the loading position are open, the rollers 58 are spread apart and the blow head L is raised but the air is not yet admitted thereto. The operator then places a blow pipe I in position with a gather of glass depending from its lower end in the mold, the mold then closes, the rollers 58 contact with and rotate the blow pipe and the blow head L drops down and engages the upper end of the tube 66, and as the corresponding port 84 turns into registration with the cutaway side of the cup bushing 87, the compressed air is admitted to the upper end of the revolving blow pipe to form the glass article in the mold. When the blowing operation is completed the port 84 passes beyond the cutaway portion of the wall of bushing 87 and is now sealed by the wall of said bushing, thus cutting off the compressed air, the blow head L is raised releasing the upper end of the blow pipe I, the mold is opened and the rollers 58 spread apart, so that the blow pipe with the finished article suspended from its lower end is removed from the machine. As the open mold still continues to swing around the axis of the machine, the corresponding water port 96 in the member N comes into registration with the water pressure chamber 99 thus causing a water spray into the interior of the open mold from the spray pipe M which spray is maintained until the port 96 passes out of registration with the chamber 99. The cooled mold now once more reaches the loading point first referred to.

It is evident that my machine is simple in construction, and therefore inexpensive, is positive and effective in operation and the various parts may be accurately synchronized and timed. Also any size and design of mold can be used in my machine providing a wide range of articles which can be manufactured with the same.

There is a great advantage in adjusting the mold table D vertically in relation to the sleeve C to accommodate different characters of molds, as it is much easier to shift the level of the mold table than to shift the pipe rotating mechanism of the blow heads.

Although, for the sake of clearness, I have minutely described the embodiment of the principles of my invention shown in the drawings, I do not wish to limit myself thereby, but claim broadly:

1. In a paste mold machine, a blow pipe, a pair of rollers engaging said pipe to rotate the same, means for driving said rollers, resilient means for holding said rollers in contact with said pipe, and automatically operating means for disengaging said rollers from said pipe upon the completion of the blowing operation.

2. In a paste mold machine, a blow pipe, a pair constantly driven rollers engaging said pipe to rotate the same, resilient means for holding said rollers in contact with said pipe, and automatically operating means directly connected to the mounting of said rollers for disengaging said rollers from said pipe upon the completion of the blowing operation.

3. In a paste mold machine, a blow pipe, a pair of rollers constantly driven, resilient means for compressing said rollers together into engagement with said pipe to rotate the same, and means directly connected to the mounting of said rollers for spreading said rollers apart to release said pipe upon the completion of the blowing operation.

4. In a paste mold machine, a blow pipe, a rotary support, a pair of arms pivoted to said support, a driven roller journaled on the end of each arm, means for compressing said arms together to hold said rollers in resilient engagement with said glow pipe, and means connected to said arms for spreading said arms to disengage said rollers from said pipe when the blowing operation is completed.

5. In a paste mold machine, a blow pipe, a rotary support, a pair of arms pivoted to said support, a driven roller journaled on the end of each arm, means for compressing said arms together to hold said rollers in resilient engagement with said blow-pipe, a slide connected to said arms and adapted to spread said rollers to disengage them from the pipe, and a fixed member adapted to be engaged by said slide for actuating the same to spread said rolls when the blowing operation is completed.

6. In a paste mold machine, a blow pipe, an idle roller bearing against said blow pipe, a pair of driven rollers engaging said pipe, said three rollers being associated to hold said pipe in proper alinement, and means connected to said driven rollers for disengaging said driven rollers from said pipe when the blowing operation is completed.

7. In a paste mold machine, a blow pipe, an idle roller engaging said blow pipe, a pair of driven rollers resiliently pressed against said pipe to rotate the same, said three rollers being associated to hold said pipe in proper alinement, and automatically operated means for disengaging said driven rollers from said pipe when the blowing operation is completed.

8. In a paste mold machine, a revolving support, a fixed gear axially alined with said support, pairs of pipe rotating rollers moving with said support, gears carried by said rollers and meshing with said fixed gear to rotate said rollers, and means for resiliently pressing said rollers into engagement with the blow pipes.

9. In a paste mold machine, a revolving support, a fixed gear axially alined with said support, pairs of pipe rotating rollers moving with said support, gears carried by said rollers and meshing with said fixed gear to rotate said rollers, means for resiliently pressing said rollers into engagement with the blow pipe, and means for automatically releasing said rollers from said blow pipe after the completion of the blowing operation.

10. In a glass machine, a rotary mold table, a partible mold mounted on said table, shafts operatively connected to the parts of said mold whereby the rotation of said shafts in the proper directions acts to open and close said mold, and means actuated by a stationary part of said machine to rotate said shafts.

11. In a glass machine, a rotary mold table, a partible mold mounted on said table, shafts operatively connected to the parts of said mold whereby the rotation of said shafts in the proper directions acts to open and close said mold, a cam track and a member engaging said cam track and associated with said shafts to rotate said shafts for opening and closing said molds.

12. In a glass machine, a rotary mold table, a partible mold mounted on said table, shafts operatively connected to the parts of said mold whereby the rotation of said shafts in the proper directions acts to open and close said molds, an adjustable cam track, and a member associated with said shafts and engaging said cam track to rotate said shafts for opening and closing said molds.

13. In a glass machine, a rotary mold table, a partible mold mounted on said table, shafts journaled on said table and linked to the parts of said mold whereby the rotation of said shafts in the proper directions acts to open and close said mold, a cam track, and means engaging said cam track and associated with said shafts, whereby the movement of said table causes said mold to open and close at the proper points in its travel.

14. In a glass machine, a rotary mold table, a partible mold mounted on said table, shafts journaled on said table and linked to the parts of said mold whereby the rotation of said shafts in the proper directions acts to open and close said mold, a cam track, means engaging said cam track and associated with said shafts, and means for adjusting said cam track to regulate the operation of said mold.

15. In a paste mold machine, a fixed support, a mold table rotatably mounted on said support, a plurality of partible molds mounted in annular series on said table, means for opening and closing said molds at the proper moments as the table rotates, a water discharge device associated with each of said molds, a member rotating with said table and provided with individual water passages connected to said water discharge devices, a fixed member provided with a water chamber, means for maintaining a supply of water in said chamber, and means whereby said passages in said rotating member are in turn connected up with said water chamber when the corresponding molds are open.

16. In a paste mold machine, a fixed support, a mold table rotating on said support, a partible mold mounted on said table, means for opening and closing said mold, a water discharge device associated with said mold, a member mounted on said support and rotating with said table, the perimeter of said member being provided with an L-shape passage, the vertical leg of which is connected to said discharge device, a block engaging the perimeter of said member having a chamber cut into its face, and means whereby water is supplied to said chamber, whereby when the horizontal leg of said passage comes into registration with said chamber water is supplied to said discharge device.

17. In a glass machine, a rotary mold support, a fixed cam member, a partible mold mounted on said support, shafts associated with the mold part in such a manner that the rotation of said shafts opens and closes the molds, a depending sleeve fitting down over each shaft, means for locking said shafts to their respective sleeves and means associated with said sleeves to rotate the same and engaging said fixed cam tracks.

18. In a glass machine, a rotary mold support, a fixed cam member, a partible mold mounted on said support, shafts associated with the mold parts in such a manner that the rotation of said shafts opens and closes the molds, means engaging said cam track for rotating shafts, and means for adjusting the effective length of said shafts to permit of raising or lowering said mold support.

19. In a glass machine, a rotating mold support, a fixed cam track, a partible mold mounted on said support, shafts associated with the mold parts in such a manner that the opening and closing of said molds is effected by the rotation of said shafts, sleeves having a slip on connection with said shafts, means for rotating said sleeves engaging said cam track, and a yielding connection between said sleeves and said shafts to impart rotation to the latter.

Signed at Pittsburgh, Pa., this 18th day of Sept., 1919.

WILLIAM J. MILLER.